US009609808B2

(12) United States Patent
Dumarey et al.

(10) Patent No.: US 9,609,808 B2
(45) Date of Patent: Apr. 4, 2017

(54) AGRICULTURAL RECTANGULAR BALER AND METHOD FOR USE THEREOF

(71) Applicant: CNH Industrial America LLC, New Holland, PA (US)

(72) Inventors: Robrecht M. K. Dumarey, Gistel (BE); Sandor Van Vooren, Sijsele-Damme (BE); Pieter Vandevelde, Sint Michiels Brugge (BE); Olivier Arnel Vanhercke, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/909,420

(22) PCT Filed: Jul. 31, 2014

(86) PCT No.: PCT/EP2014/066472
§ 371 (c)(1),
(2) Date: Feb. 1, 2016

(87) PCT Pub. No.: WO2015/014928
PCT Pub. Date: Feb. 5, 2015

(65) Prior Publication Data
US 2016/0192592 A1 Jul. 7, 2016

(30) Foreign Application Priority Data

Aug. 1, 2013 (BE) .................................. 2013/0516

(51) Int. Cl.
*A01F 15/04* (2006.01)
*A01F 15/10* (2006.01)

(52) U.S. Cl.
CPC .......... *A01F 15/042* (2013.01); *A01F 15/046* (2013.01); *A01F 15/101* (2013.01); *A01F 2015/102* (2013.01)

(58) Field of Classification Search
CPC ........ A01F 15/10; A01F 15/08; A01F 15/101; A01F 15/042; A01F 15/046; A01F 15/0825; A01F 2015/102
(Continued)

(56) References Cited

U.S. PATENT DOCUMENTS 5,768,872 A * 6/1998 Von Allworden .... A01F 15/101
56/341
6,050,074 A * 4/2000 Clostermeyer ....... A01F 15/101
100/88
(Continued)

*Primary Examiner* — Jimmy T Nguyen
(74) *Attorney, Agent, or Firm* — Patrick M. Sheldrake

(57) ABSTRACT

Agricultural baler with feeder system arranged for repeatedly feeding crop material towards a baling chamber, the feeder system includes a feeding chamber and a stuffer. The feeder system is arranged for collecting a crop material. The stuffer is arranged for repeatedly carrying out a stuffing cycle and varying an entry position and/or an exit position and/or a stroke depth. The feeder system further includes a sensor arranged for generating a signal indicative of the accumulated crop material in the feeding chamber. A controller that is arranged for triggering the stuffer to start a stuffing cycle wherein the entry position, the exit position, and/or the stroke depth, is adjusted in response to an indication by the sensor signal of the accumulated crop material in the feeding chamber.

14 Claims, 7 Drawing Sheets

(58) Field of Classification Search
USPC .................... 100/7, 179, 188 R, 189; 56/341
See application file for complete search history.

(56) References Cited

U.S. PATENT DOCUMENTS

| | | | |
|---|---|---|---|
| 6,862,876 B2* | 3/2005 | Amstel Van ............ | A01F 15/10 100/88 |
| 7,047,719 B2* | 5/2006 | Dubois .................. | A01F 15/101 100/50 |
| 7,287,365 B2* | 10/2007 | Dubois .................. | A01F 15/101 100/88 |
| 8,561,532 B2 | 10/2013 | Bergmann | |
| 8,627,766 B2 | 1/2014 | Verhaeghe et al. | |
| 8,826,816 B2 | 9/2014 | Vergote | |
| 2003/0106299 A1* | 6/2003 | Vogt ...................... | A01F 15/101 56/341 |
| 2012/0179338 A1 | 7/2012 | Dresher | |

* cited by examiner

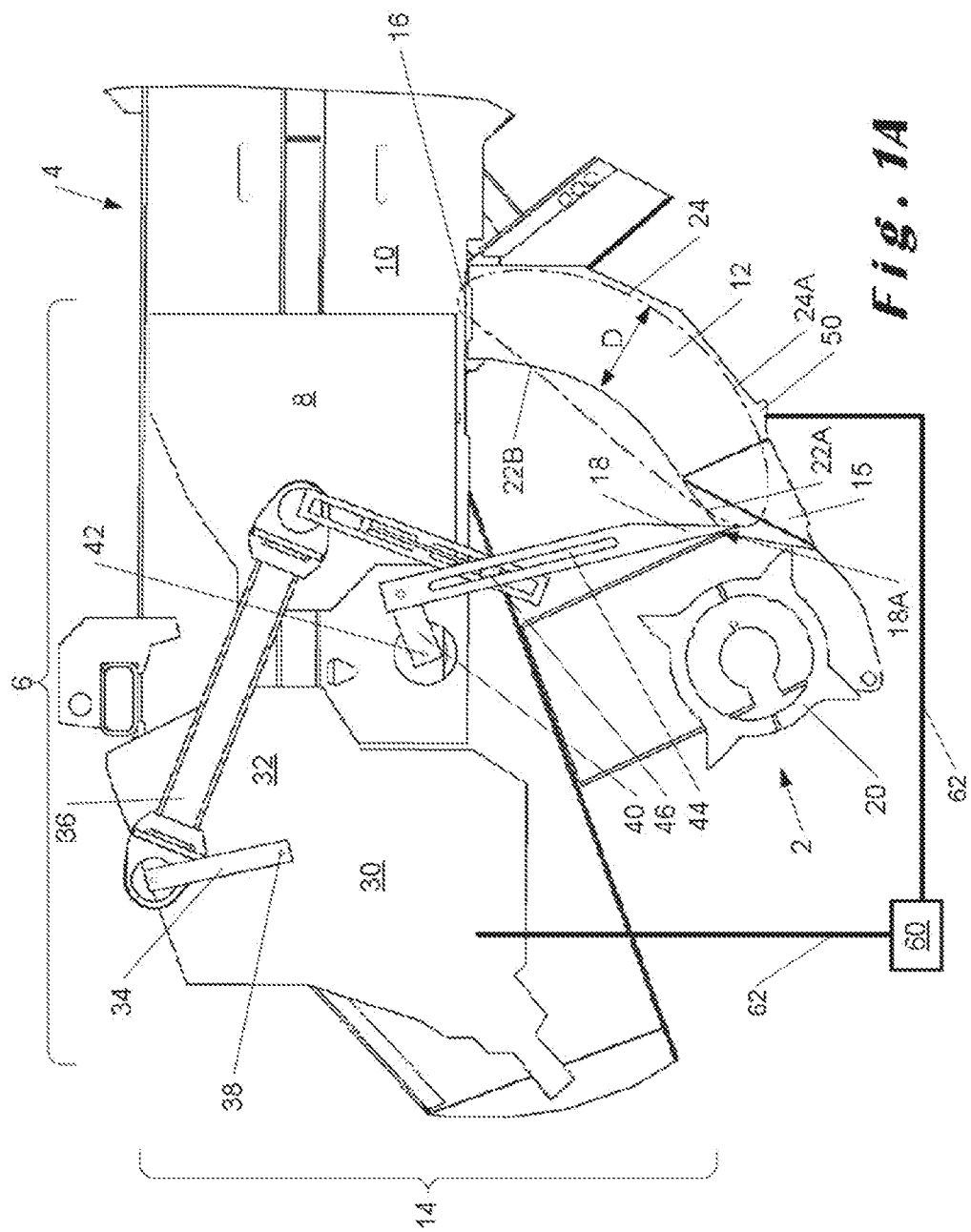

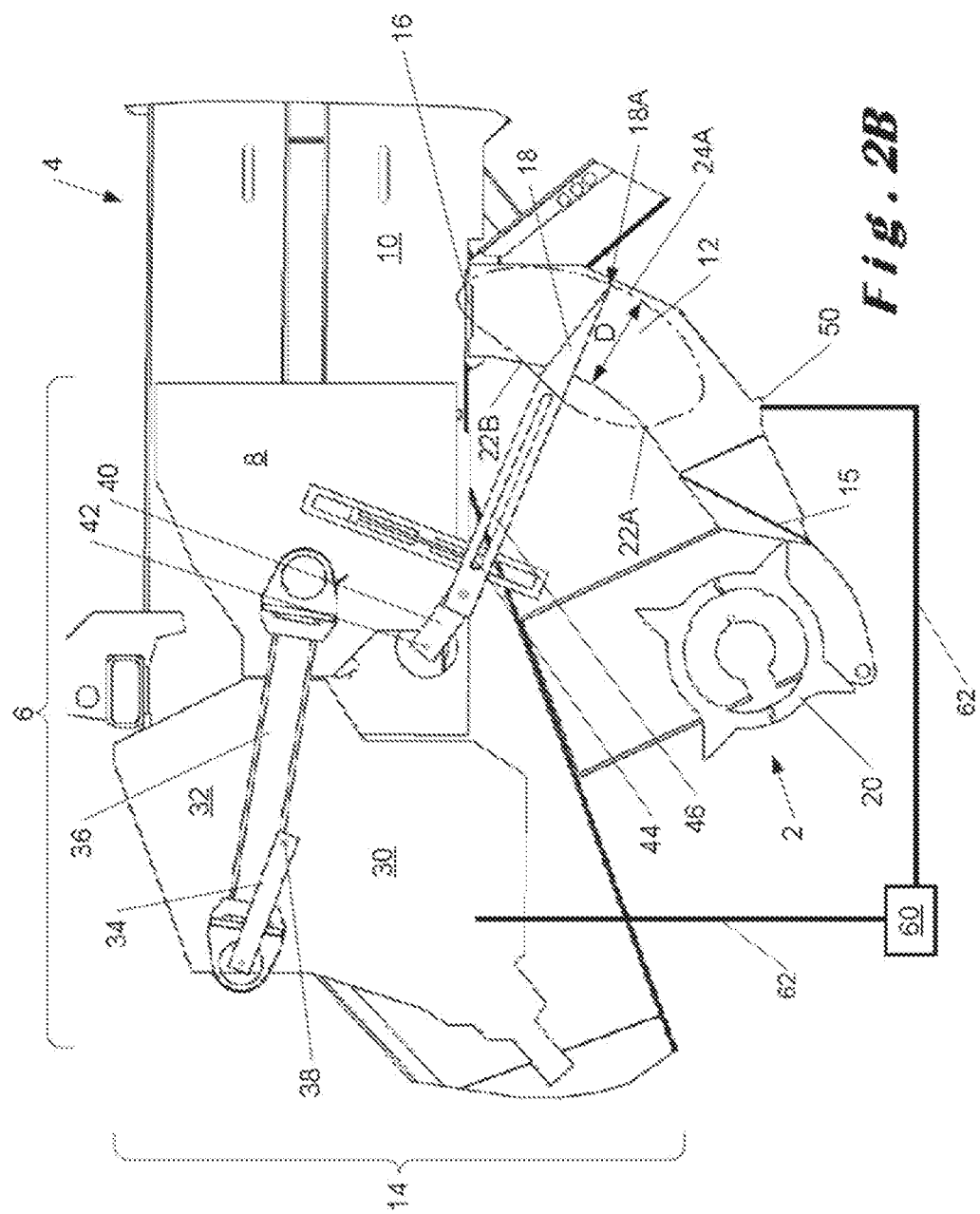

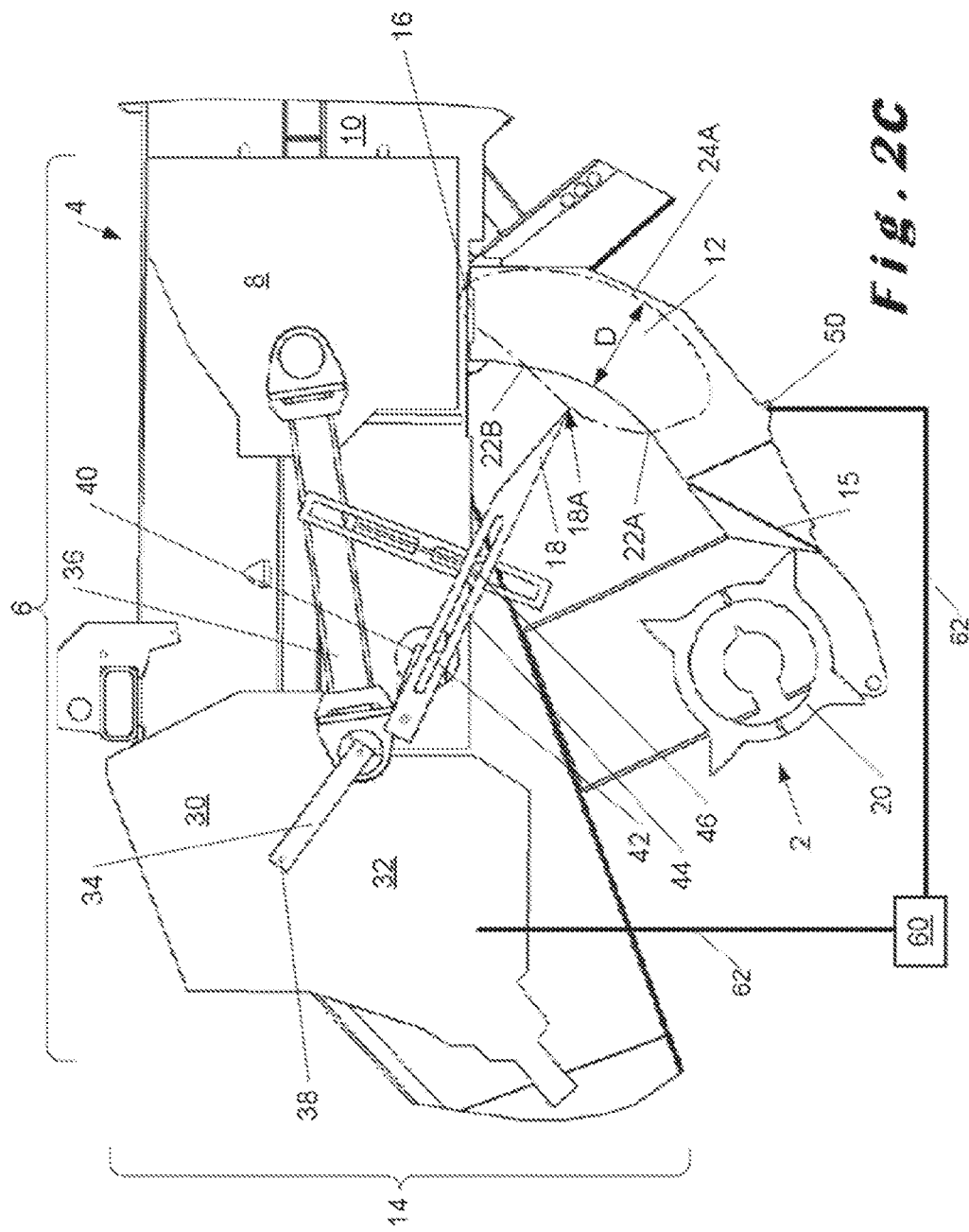

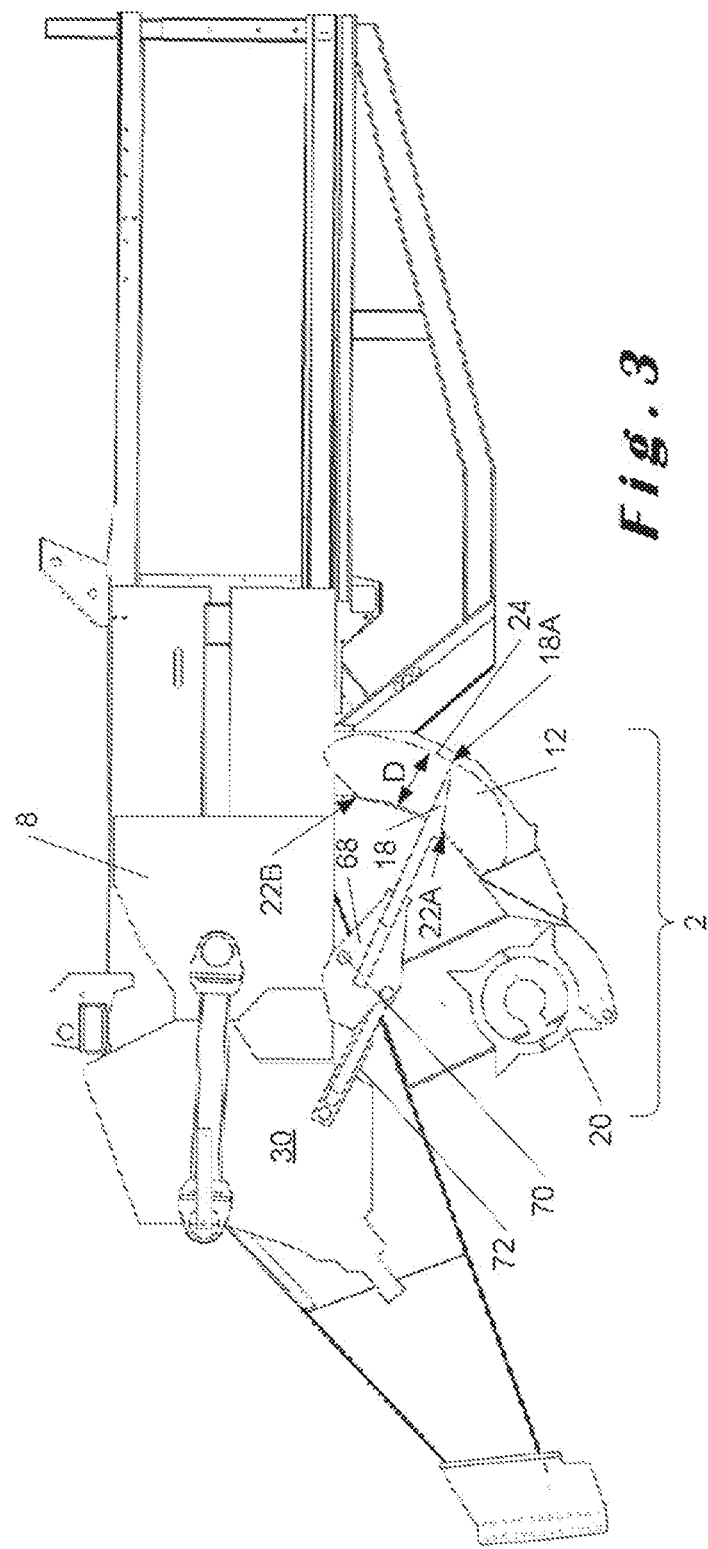

AGRICULTURAL RECTANGULAR BALER AND METHOD FOR USE THEREOF

This application is the US National Stage filing of International Application Serial No. PCT/EP2014/066472 filed on Jul. 31, 2014 which claims priority to Belgian Application BE2013/0516 filed Aug. 1, 2013, each of which is incorporated herein by reference in its entirety.

TECHNICAL FIELD

The present invention relates to agricultural balers for the formation of square bales of crop material, such as hay, straw or silage in a bale chamber. The invention also relates to a method for use of such an agricultural baler.

BACKGROUND ART

An agricultural baler is known e.g. from EP 1 066 747. The agricultural baler described therein is provided with a plunger and a baling chamber, and is arranged for repeatedly forming bales by moving the plunger back and forth in the baling chamber. The agricultural baler is further provided with a pick-up system for picking up crop material from the field and a feeder system being arranged for repeatedly feeding a quantity of crop material towards the baling chamber such that the crop material can be pressed by the plunger in the baling chamber to form a bale.

In practice, there is a desire to produce bales of approximately uniform size and weight. Therefore, a quantity of the crop material that is repeatedly fed towards the baling chamber and that is pressed into a bale, preferably is approximately constant. However, there are several factors that may prevent the constant feeding of crop material to the baling chamber.

Firstly, the frequency of repetition of the plunger may be different from the frequency of repetition of the stuffer or a multiple thereof. Such a stuffer frequency may be approximately defined by a filling time of the feeding chamber. Thus, when the stuffer is ready for feeding a quantity of crop material towards the baling chamber, the plunger may be in an extended, pressing position instead of a retracted position. When the plunger is in the pressing position, it will close of the feed opening such that it is not possible to push crop material in the baling chamber. As a result, the stuffer needs to be delayed in order to wait for the plunger to be retracted and clearing the feed opening into the baling chamber. Experience showed that, as a result of such waiting, the amount of accumulated crop material which is stuffed into the baling chamber by one feed stroke changes. As a result, the quantity of crop material that is pressed into each slice of the bale may change as well. Thus, the resulting bale can have a size and/or weight that is different from the desired size and/or weight.

Secondly, the composition of the crop material may change during use of the agricultural baler, or in between different periods of use of the agricultural baler. The amount of crop material available on the field at specific locations on the field may vary due to e.g. lack of fertilisation or lower and wet land. Such change in composition may also lead to a change in composition of the crop material stuffed into the baling chamber, and hence to a change in a quantity of crop material pressed into a bale. Thus again, the resulting bale can have a size and/or weight that is different from the desired size and/or weight.

FIELD OF THE INVENTION

It is an object to obtain an improved agricultural baler and method for using such baler. In particular, it may be an object to provide an agricultural baler and method for using such baler decreasing a variability of a quantity of a crop material fed into a baling chamber.

According to an aspect, there is provided an agricultural rectangular baler comprising a feeder system being arranged for repeatedly feeding a quantity of a crop material towards a baling chamber of the baler, for example when the plunger is in a feeding position, the feeder system comprising a feeding chamber and a stuffer comprising a pushing element, wherein the stuffer is arranged for repeatedly carrying out a stuffing cycle that comprises moving the pushing element at least partly into the feeding chamber at an entry position positioned along the feeding chamber, moving the pushing element through the feeding chamber for carrying out a stuffing stroke having a stroke depth into the feeding chamber, and moving the pushing element, optionally at least partly, out of the feeding chamber at an exit position positioned along the feeding chamber, so that, in use, crop material that has accumulated in the feeding chamber is fed to the baling chamber as a result of the stuffing stroke, the stuffer being arranged for varying the entry position, the exit position, and/or the stroke depth, wherein the feeder system further comprises a sensor that is arranged for generating a sensor signal that is indicative for an amount of the accumulated crop material in the feeding chamber, and wherein the feeder system comprises a controller coupled, preferably communicatively, e.g. wired and/or wirelessly, coupled, to the sensor and the stuffer, wherein the controller is further arranged for, optionally after determining that the plunger has reached a predetermined position and optionally after receipt of the sensor signal being indicative for at least a predetermined amount of accumulated crop material in the feeding chamber, triggering the stuffer to start a stuffing cycle wherein the entry position, the exit position, in particular a distance between the entry position and the exit position, and/or the stroke depth, is adjusted, preferably by the stuffer, in response to an indication by means of the sensor signal of the amount of the accumulated crop material in the feeding chamber, for example directed by the controller or directly by the sensor signal. The entry position preferably is positioned at the inlet such that the pushing can cover the entire length of the feeding chamber and that for example the amount of crop material present in between the inlet and the entry position is kept to a minimum. More preferably, the exit position is positioned closely to the outlet of the feeding chamber such that the stroke depth substantially corresponds to the length of the feeding chamber. The controller (60) is further arranged for triggering the stuffer to start a stuffing cycle wherein a distance between the entry position and the exit position is increased in response to an indication by means of the sensor signal of the amount of the accumulated crop material in the feeding chamber being less than a lower amount value.

Preferably, the baler is provided with a plunger provided in the baling chamber of the baler and is arranged for repeatedly forming bales by moving the plunger back and forth in between, on the one hand, feeding positions wherein a crop material can be fed into the baling chamber and, on the other hand, pressing positions wherein the crop material can be pressed into a bale.

Preferably, the feeding chamber has an inlet and an outlet and in use extends towards the baling chamber with the outlet positioned adjacent to and/or directed towards the baling chamber.

Preferably, the feeder system is arranged for, preferably continuously, collecting a crop material and forcing the collected crop material into the feeding chamber via the inlet of the feeding chamber.

Preferably, in use, crop material that has accumulated in the feeding chamber is transported through the outlet as a result of the stuffing stroke.

Preferably, the controller is arranged for determining a position of the plunger.

Preferably, the controller is further arranged for, more preferably after determining that the plunger has reached a predetermined position and after receipt of the sensor signal being indicative for at least a predetermined amount of accumulated crop material in the feeding chamber, triggering the stuffer to start a stuffing cycle wherein at least, or preferably only as discussed above when the entry position is position at the inlet, the exit position is adjusted in response to an indication by means of the sensor signal of the amount of the accumulated crop material in the feeding chamber.

According to an aspect, there is provided a method of repeatedly feeding a quantity of a crop material towards a baling chamber of an agricultural rectangular baler, preferably the baler according to the present invention, by means of a feeder system comprising a feeding chamber and a stuffer that comprises a pushing element, wherein the feeding chamber preferably has an inlet and an outlet and in use extends towards the baling chamber with the outlet positioned adjacent to and/or directed towards the baling chamber, the method comprising: —preferably, repeatedly forming bales by moving a plunger provided in the baling chamber back and forth in between, on the one hand, feeding positions wherein a crop material can be fed into the baling chamber and, on the other hand, pressing positions wherein the crop material can be pressed into a bale; —preferably continuously, collecting a crop material and forcing the collected crop material into the feeding chamber via an inlet, preferably the inlet, of the feeding chamber; —repeatedly carrying out a stuffing cycle that comprises moving the pushing element at least partly into the feeding chamber at an entry position positioned along the feeding chamber, moving the pushing element through the feeding chamber for carrying out a stuffing stroke having a stroke depth into the feeding chamber, and moving the pushing element, optionally at least partly, out of the feeding chamber at an exit position positioned along the feeding chamber, so that, after carrying out a stuffing cycle, crop material that has accumulated in the feeding chamber is transported through the outlet and fed to the baling chamber as a result of the stuffing stroke; —generating, by means of a sensor of the feeder system, a sensor signal that is indicative for an amount of the accumulated crop material in the feeding chamber, —preferably determining, by means of a controller of the feeder system, a position of the plunger; —triggering, by means of the controller that is coupled, preferably communicatively, e.g. wired and/or wirelessly, coupled, to the sensor and the stuffer, optionally after determining that the plunger has reached a predetermined position and optionally after receipt of the sensor signal being indicative for at least a predetermined amount of accumulated crop material in the feeding chamber, the stuffer to start a stuffing cycle; and—adjusting, preferably the stuffer adjusting, in said started stuffing cycle, the entry position, the exit position, in particular a distance between the entry position and the exit position, and/or the stroke depth, in response to an indication by means of the sensor signal of the amount of the accumulated crop material in the feeding chamber. Preferably, the method comprises adjusting, preferably the stuffer adjusting, in said started stuffing cycle, at least, or only, the entry position or the exit position, in response to an indication by means of the sensor signal of the amount of the accumulated crop material in the feeding chamber, such that the distance between the entry position and the exit position is increased.

Such aspects may enable that an amount of crop material fed into the baling chamber during a stuffing cycle, can be decreased or increased. An increase can e.g. be achieved when a distance between the entry position and the exit position is increased, or when the stroke depth is increased. Such an increase may e.g. be applied when a decreased amount of crop material in the feeding chamber (in other words, an underfill) during the carrying out of a stuffer stroke can be inferred from the sensor signal. A decrease can e.g. be achieved when a distance between the entry position and the exit position is decreased, or when the stroke depth is decreased. Such a decrease may e.g. be applied when an increased amount of crop material in the feeding chamber (in other words, an overfill) during the carrying out of a stuffer stroke can be inferred from the sensor signal. Thus, an amount of crop material fed into the baling chamber during a stuffing cycle can be adjusted. Such adjustment may be in response to the sensor signal. Such adjustment may be controlled by the controller. It may thus be appreciated that, by means of the sensor and the controller, underfill or overfill of the feeding chamber may be detected, and a stuffer stroke may be adjusted in response thereto.

Without wanting to be bound by any theory, the inventors found that the quantity of crop material fed to the baling chamber can be increased when a stuffing cycle is delayed in order to wait for the plunger to reach a feeding position or a position adjacent thereto. Such an increase may be caused by an increase of crop material accumulated in a part of the feeding chamber covered by the stuffing stroke, possibly as a result of compaction of the crop material in the feeding chamber, e.g. near the outlet. The inventors also found that the amount of crop material fed to the baling chamber can be decreased when a stuffing cycle is advanced in time in order to prevent that the plunger has left a feeding position during a stuffing cycle.

According to said aspects, the entry position, the exit position, and/or the stroke depth, is adjusted, preferably by the stuffer, more preferably in response to the controller. Instead, optionally, a path of the pushing element in the feeding chamber, e.g. in between the entry position and the exit position, is adjusted.

It is noted that publication DE 3437294 C2 relates to an agricultural baler having a type of an adjustable stuffer, however without disclosing i.a. the controller and the sensor. It is further noted that WO 2011/053122 relates to an agricultural baler having a type of an adjustable stuffer. The baler of WO 2011/053122 is provided with a particular type of sensor that positioned close to the outlet of the feeding chamber. Although use of this sensor for triggering a stuffer cycle is disclosed, WO 2011/053122 does i.a. not disclose adjusting a parameter of the stuffer cycle in response to a sensor signal generated by this sensor. In particular, i.a. adjustment of the entry position, the exit position and/or of the stroke depth, in response to an indication by means of a sensor signal of the amount of the accumulated crop material in the feeding chamber, is not disclosed in WO 2011/053122.

US 2012/186463 discloses an agricultural baler which is able to detect a blockage in the intake duct of the baler. The path of the tines is temporarily modified from the normal path to a path whereby only a fraction of the crop material accumulated in the intake duct is loaded into the baling chamber. Subsequently, the path of the tines is restored to the normal path. By decreasing the distance between the entry point of the tines and the exit point of the tines in the intake duct of the baler, only a portion of the crop will be pushed into the baling chamber. When during the next stuffing stroke the normal path is again followed, lesser material will need to be pushed inside the baling chamber and it is likely that the blockage is resolved. This system is directed to feeding a portion of the material available in the feeding duct into the baling chamber when a blockage is noticed. However, this document does not deal with the problem of adjusting the normal stuffer path if not enough material is available in the intake duct to provide for a comparable amount of crop material in the baling chamber.

Also, US 2012/179338 shows an agricultural baler having a density feedback system. The stuffer arms are equipped with a fork comprising a load sensor configured to sense the load corresponding to the crop material moved by the fork in the intake duct. If the load sensed by the sensor is sufficiently high, the fork will be extracted out of the intake duct during the pre-compression cycle of the crop material in the intake duct. It will again be brought into the intake duct at the beginning of this duct in order to pre-compress the newly entered crop material. When the intake duct is filled with crop material at the correct density, the crop material will be brought into the baling chamber by the forks which will now perform a stuffing cycle. During this stuffing cycle, holding fingers are moved out of the way to allow the pre-compressed material to be brought inside the baling chamber and the forks are moved from the beginning of the intake duct to the end of the intake duct to perform a normal stuffing cycle. Again, no indication is given in this document to solve the problem of adjusting the normal stuffer path if not enough material is available in the intake duct to provide for a comparable amount of crop material in the baling chamber. It simply shows that the path of the forks during the pre-compression cycles can be adjusted to provide for an adequate filing of the intake duct.

In an embodiment, the feeder system comprises a plunger sensor that is indicative for a position of the plunger and that is coupled to the controller. Thus, in an embodiment, the controller may be arranged for determining that the plunger has reached a predetermined position.

In an embodiment, the sensor signal contains information on a time elapsed since a bale was formed. Preferably, the sensor signal is indicative for at least a predetermined amount of accumulated crop material in the feeding chamber by said information being indicative for the time elapsed since a bale was formed exceeding, i.e. being larger than, a lower time limit Such a lower time limit may e.g. be set by a user or may be based on formation of previous bales. The lower time limit may be chosen such that enough crop material can be expected to be present in the feeding chamber for a stuffer stroke to be worthwhile to be carried out.

The invention also provides a plurality of bales produced by means of a feeder system according to the invention and/or by means of a method according to the invention. Said plurality of bales may contain all bales that are produced during a certain time period, e.g. during a time period of least ten minutes, or during a plurality of separate time periods, e.g. during at least two time periods of at least ten minutes that are mutually spaced apart in time. Bales collected during a first time period of said at least two time periods may be formed from crop material collected from a different piece of land than a piece of land from which crop material is collected from which bales are formed during a second time period of said at least two time periods. In an embodiment, a variation of an individual bale mass of all bales of the plurality of bales is within 15%, preferably within 12%, more preferably within 7%, of an average individual bale mass of all bales of said plurality of bales.

Further advantageous embodiments are described in the subclaims and with respect to the appended drawings.

BRIEF DESCRIPTION OF THE DRAWINGS

The invention will further be illustrated with reference to the non-limiting drawing, wherein:

FIG. 1A shows an agricultural baler with a feeder system wherein a plunger is in a first position, wherein a distance between an entry position and an exit position of a pushing element in the feeding chamber is increased;

FIG. 2B shows an agricultural baler with a feeder system wherein a plunger is in a second position, wherein a distance between an entry position and an exit position of a pushing element in the feeding chamber is decreased;

FIG. 2C shows an agricultural baler with a feeder system wherein a plunger is in a third position, wherein a distance between an entry position and an exit position of a pushing element in the feeding chamber is decreased; and FIG. 3 shows an agricultural baler with a feeder system in an embodiment according to the invention showing a normal stuffer cycle.

DETAILED DESCRIPTION OF PREFERRED EMBODIMENTS

The present invention will be described with respect to particular embodiments and with reference to certain drawings but the invention is not limited thereto. The terms first, second, third and the like in the description and in the claims, may be used for distinguishing between elements and not necessarily for describing a sequential or chronological order. The terms are interchangeable under appropriate circumstances and the embodiments of the invention can operate in other sequences than described or illustrated herein. The terms top, bottom, over, under and the like in the description and the claims are used for descriptive purposes and not necessarily for describing relative positions. The terms so used are interchangeable under appropriate circumstances. The embodiments of the invention described herein can operate in other orientations than described or illustrated herein. The term "a" does not exclude a plurality. The term "comprising" should not be interpreted as being restricted to the means listed thereafter; it does not exclude other elements or steps. Thus, the scope of the expression "a device comprising means A and B" should not be limited to devices consisting only of components A and B.

Figure 1B:
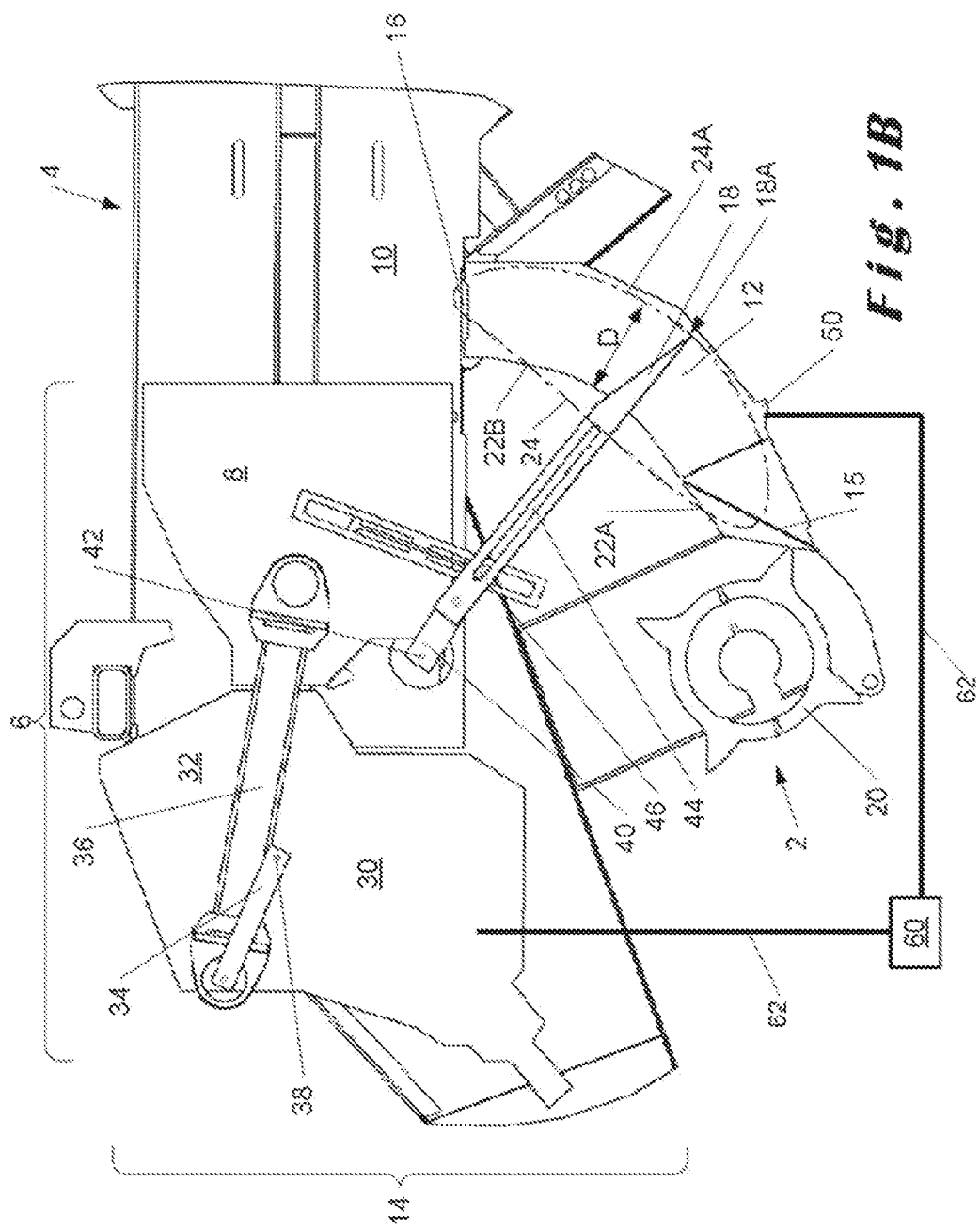
FIG. 1B shows an agricultural baler with a feeder system wherein a plunger is in a second position, wherein a distance between an entry position and an exit position of a pushing element in the feeding chamber is increased.
Figure 1C:
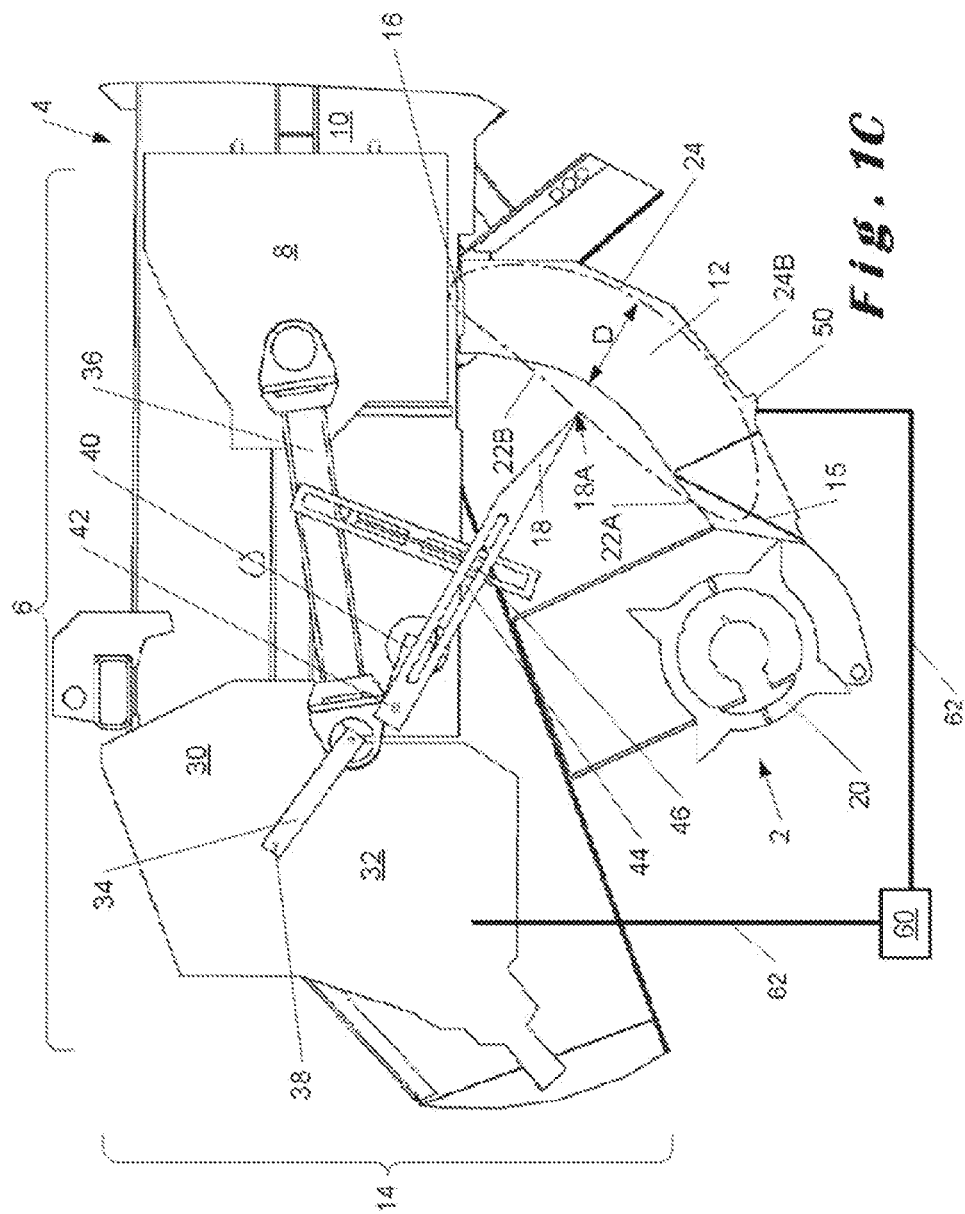
FIG. 1C shows an agricultural baler with a feeder system wherein a plunger is in a third position, wherein a distance between an entry position and an exit position of a pushing element in the feeding chamber is increased.
Figure 2A:
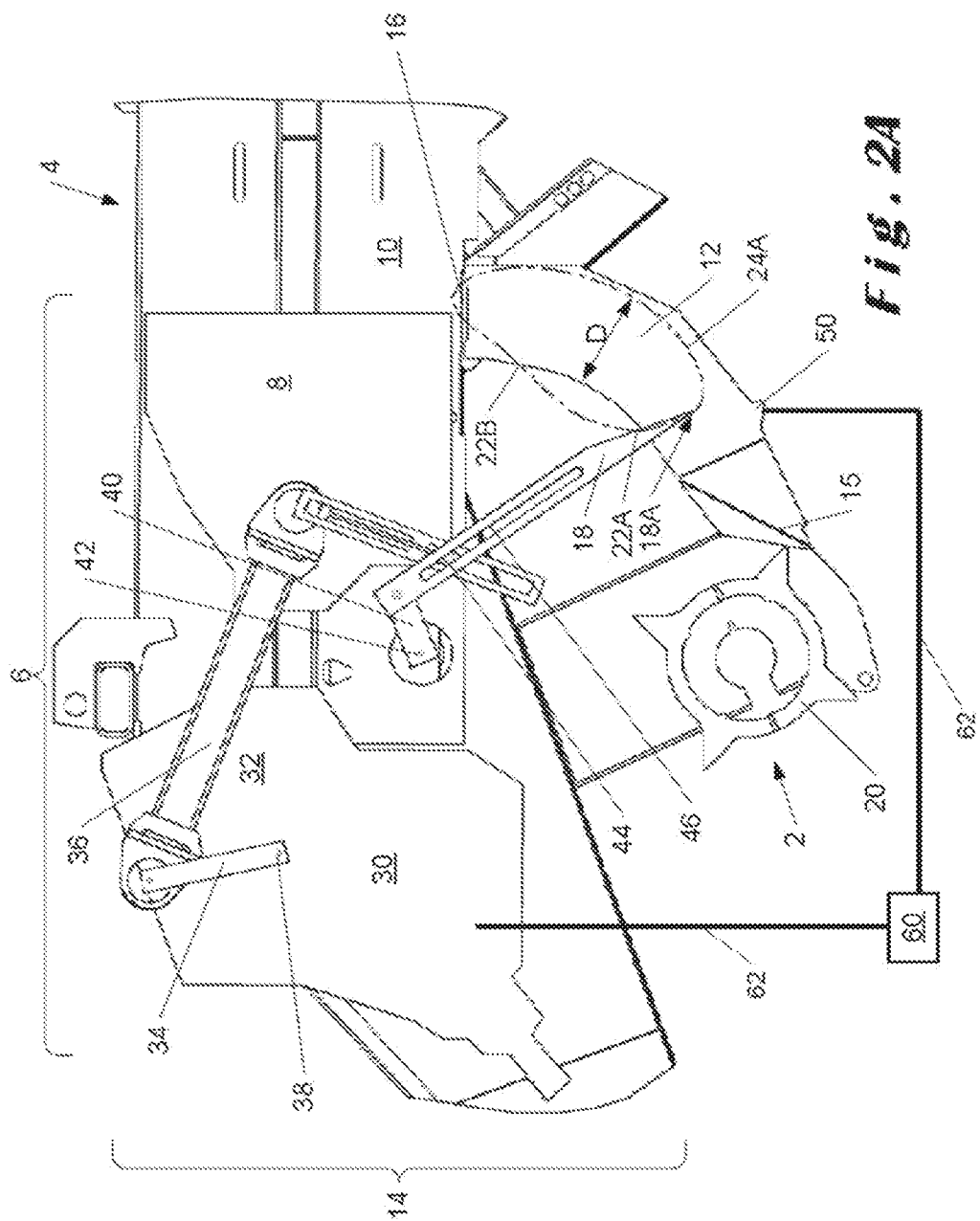
FIG. 2A shows an agricultural baler with a feeder system wherein a plunger is in a first position, wherein a distance between an entry position and an exit position of a pushing element in the feeding chamber is decreased.

FIGS. 1A-2C show a feeder system 2 in an embodiment according to the invention. The feeder system 2 is arranged for use in an agricultural rectangular baler 4. The term "rectangular" as used in the term "rectangular baler" or "agricultural rectangular baler" refers to an approximate shape of bales that are formed by means of the baler, not to a shape of the baler itself, although one or more parts of the baler may optionally have a rectangular shape. Said baler 4 is provided with a plunger 8 and a baling chamber 10 together forming a so-called press 6. FIGS. 1A and 2A show the plunger 8 in a first position. FIGS. 1B and 2B show the plunger 8 in a second position. FIGS. 1C and 2C show the plunger 8 in a third position.

The feeder system 2 comprises a feeding chamber 12 and a stuffer 14. The feeding chamber 12 as shown in the figures preferably has an inlet 15 and an outlet 16. In use, the feeding chamber 12 extends towards the baling chamber 10. The outlet 16 as shown preferably is positioned adjacent to the baling chamber 10, preferably at the bottom of the baling chamber 10 as shown in the figures. As shown, the outlet 16 preferably is directed towards the baling chamber 10, e.g. is facing the baling chamber. The baler 4 is arranged for repeatedly forming bales by moving the plunger back and forth. When the plunger 8 is in a feeding position, crop material can be fed into the baling chamber from the feeding chamber 12, in particular from the outlet 16 of the feeding chamber 12. The first position shown in FIGS. 1A and 2A, and the second position shown in FIGS. 1B and 2B, may be regarded as feeding positions. In the first and second position, the outlet 16 of the feeding chamber 12 is unblocked by the plunger 8. As a result, an open connection between the feeding chamber 12 and the baling chamber 10 can be provided.

Hence, crop material can be transported from the feeding chamber 12 through the outlet 16 and fed to the baling chamber 10. When the plunger 8 is in a pressing position, the crop material can be pressed into a bale. FIGS. 1C and 2C show the plunger 8 in one of the pressing positions. Thus, the third position may be regarded as a pressing position. In the third position, the outlet 16 of the feeding chamber 12 may be blocked by the plunger 8. Hence, it may be clear that, more in general, the baler 4 is arranged for repeatedly forming bales by moving the plunger back and forth in between, on the one hand, feeding positions wherein a crop material can be fed into the baling chamber and, on the other hand, pressing positions wherein the crop material can be pressed into a bale.

Examples of crop materials may e.g. comprise hay or straw, or may substantially consist of hay or straw. Other types of crop materials that are suitable to be formed into a bale may also be used.

The feeder system 2 is arranged for, preferably continuously, collecting a crop material and forcing the collected crop material into the feeding chamber 12 via the inlet 15 of the feeding chamber 12. As a result, the feeding chamber can be filled, e.g. partially filled. As a result, crop material can accumulate in the feeding chamber 12. Such accumulation may, more in general, be in the feeding chamber away from the inlet. After carrying out a stuffing stroke, accumulation may start near the inlet 15 during an early stage of the filling of the feeding chamber. An amount of accumulated crop material may, during filling of the feeding chamber, occupy a volume in the feeding chamber that gradually increases, as a result of the filling, towards a sensor 50 and/or towards the inlet, the feeding chamber thus forming a pre-compression chamber. To enable said collecting, the feeder system may be provided with a collector 20 such as for example a rotor and/or a packer which is arranged for picking up the crop material from agricultural land. The collector 20 may be arranged for forcing the collected crop material into the feeding chamber 12. Various embodiment of such a collector 20 are known as such to the skilled person so that a further description is deemed superfluous.

Said accumulation of crop material in the feeding chamber 20 may be supported by a barrier positioned at or adjacent to the outlet of the feeding chamber 20. In an embodiment, such a barrier is adjustable. Thus, the barrier may be arranged for selectively enabling transport of crop material through the outlet into the baling chamber. The adjustable barrier may be arranged for enabling feeding of crop material into the baling chamber when the plunger is in a feeding position. The adjustable barrier may further be arranged for substantially blocking feeding of crop material into the baling chamber at least when the plunger is in a pressing position. Thus, said selectivity may be dependent on a position of the plunger. In an embodiment, the adjustable barrier, for example crop holding fingers, is arranged for substantially blocking feeding of crop material into the baling chamber at least when the plunger is in a pressing position and preferably even keeping the crop material from touching the plunger 8, thus promoting the accumulation of crop material in the feeding chamber.

The feeder system 2 is arranged for repeatedly feeding an amount of crop material with a comparable quantity towards the baling chamber 10 when the plunger is in a feeding position. The feeder system 2 comprises a pushing element 18. Such a pushing element 18 may comprise a plurality of tines. The stuffer 14 is arranged for repeatedly carrying out a stuffing cycle. Such a stuffing cycle comprises moving the pushing element, e.g. said tines of the pushing element, at least partly into the feeding chamber 12 at an entry position 22A positioned along the feeding chamber. Said stuffing cycle further comprises moving the pushing element 18 through the feeding chamber 12 for carrying out a stuffing stroke. Said stuffing stroke may have a depth D into the feeding chamber. Said depth D may vary along the feeding chamber during a stuffing stroke. Said stuffing cycle may further comprise moving the pushing element 18 out of the feeding chamber 12 at an exit position 22B positioned along the feeding chamber 12. The feeding chamber may be provided with apertures for allowing at least part of the pushing element, e.g. at least part of said tines, to enter the feeding chamber, to exit the feeding chamber, and/or to move through the feeding chamber. As a result of carrying out a stuffing cycle, in use, crop material that has accumulated in the feeding chamber 12 is transported through the outlet 16 and fed to the baling chamber 10 as a result of the stuffing stroke. Dashed-dotted line 24 indicates a path of a tip 18A of the pushing element 18 during a normal stuffing cycle. An altered path (see FIGS. 1A-1C) of the normal path 24 (see FIG. 3) from the entry position to the outlet position may be regarded as being followed by the pushing element during a stuffing cycle.

The baler 4 may be provided with driving means 30 for driving the pushing element and other moving parts of the stuffer 14. Additionally, or alternatively, the driving means 30 may be arranged for driving the plunger 8 and for example other moving parts of the baling chamber. More in general, the driving means 30 may be arranged for driving the plunger 8 of the press 6, and the stuffer 14, in particular the pushing element of the stuffer 14, preferably substantially independently of each other. Thus, the driving means may be arranged for driving the plunger with a plunger driving frequency and driving the pushing element of the stuffer with a stuffer driving frequency that can be set equal to or different from the plunger driving frequency, for example depending on any one or more of the conditions of the crop material, the weather conditions, the crop material itself, etc. Preferably, as the stuffer 14 and the plunger 8 are mechanically driven by the same driving means 30, the plunger and stuffer driving frequencies are in phase with respect to each other, more preferably thereto the ratio of the frequencies is substantially, or even substantially, a whole number, even more preferably the stuffer driving frequency is a multitude of the plunger driving frequency.

FIGS. 1A-2C illustrate a possible embodiment of the driving means 30. The driving means 30 may be provided with a housing 32. The driving means 30 may further be provided with a rotatable plunger crank 34 and a plunger bar 36. The plunger crank 34 may, at one of its ends, be rotatably connected to a plunger driver axis 38. The plunger crank 34 may, at the other one of its ends, be rotatably connected to one end of the plunger bar 36. The plunger bar 36 may, at its other end, be pivotably connected to the plunger 8. Thus, by rotating the plunger crank 34, the plunger 8 may be moved back and forth. One rotation of the plunger crank 34 corresponds to one cycle of the plunger 8, said plunger cycle (or, in other words, pressing cycle) involving movement of the plunger 8 back and forth through possible plunger positions. The driving means may further be provided with a rotatable stuffer crank 40. The stuffer crank 40 may, at one of its ends, be connected to a stuffer driver axis 42. The stuffer crank 40 may, at the other one of its ends, be rotatably connected to one end of the pushing element 18, e.g. an end of the pushing element 18 that is intended to be kept out of the feeding chamber 12. Thus, by rotating the stuffer crank 40, the pushing element 18 may be moved back and forth. eedOne rotation of the stuffer crank 40 corresponds to one stuffing cycle of the plunger 8.

The pushing element 18 may be provided with a slot 44 that extends along the pushing element 18. The driving means 30 are provided with a pin 46 that can slide through the slot 44 along the pushing element 18. The pushing element is constructed to, in use, pivot around the pin 46. Thus, the pushing element may be arranged pivotably around the pin and slidingly along the pin. A position of said pin in the feeder system may be adjustable, so that the stuffer is arranged for varying the entry position and/or the exit position and/or the stroke depth of a stuffer stroke. A linear actuator may be provided for displacing the pin. By displacing the pin 46 from one position to another position, the normal path 24 of the tip of the pushing element may be adjusted. During a stuffing cycle or a plurality of stuffing cycles, the pin 46 may be fixed. Hence, the entry position 24A, the exit position 24B, and the stroke depth D may be adjusted. In this way, as an example, the stuffer can be arranged for varying the entry position 22A and/or the exit position 22B and/or the stroke depth D.

The driving means may be arranged for driving the pushing element 18 and the plunger 8 at different frequencies. In particular, the driving means 30 may be arranged for driving the pushing element 18 at a frequency that is approximately two times larger, or approximately three times larger, than a frequency at which, in use, the pushing element is driven. Hence, the baling chamber 10 may be filled by means of a stuffing stroke for only one out of two, or three, plunger cycles. Alternatively, the driving means 30 may be arranged for driving the pushing element 18 and the plunger 8 at substantially the same frequencies. Then, substantially for every plunger cycle the baling chamber is filled. Hence, a bale, or a part of a bale in case two or more plunger cycles are used for forming a bale, can be produced for substantially every plunger cycle.

The feeder system 2 may further comprise a sensor 50 that is arranged for generating a sensor signal that is indicative for an amount of the accumulated crop material in the feeding chamber. Said sensor signal may be generated continuously, or intermittently. In an embodiment, a frequency of an intermittent signal may be at least ten, or at least twenty, times larger that a frequency of stuffer strokes. An indication for an amount of the accumulated crop material in the feeding chamber may be inferred from the sensor signal by signal processing techniques, such as averaging and/or extrapolation. The controller may be arranged to carry out the signal processing techniques. Used signal processing techniques may be known as such to the skilled person. An obtained sensor signal, e.g. obtained during an early stage of the filling process of the feeding chamber, may e.g. be extrapolated in order to predict when at least a predetermined amount of accumulated product is present in the feeding chamber and a moment of starting a stuffing cycle is reached. Alternatively or additionally, an obtained sensor signal may be combined with previously obtained sensor signals, and/or with an expected sensor signal, in order to decrease a variability in the obtained sensor signal. In an embodiment, a frequency of the intermittent signal may be approximately equal to a frequency of the stuffer strokes. Thus, approximately one sensor signal element or sensor signal event—said elements or events then making up a sensor signal—may be generated for a stuffer stroke. Such a signal element or signal event may be generated by the sensor once a predetermined amount, e.g. volume or mass, of crop material has been reached in the feeding chamber 12.

The sensor 50 may be provided with mechanical sensor means that are arranged for generating a sensor signal that is indicative for a weight of the accumulated crop material in the feeding chamber. In that way the sensor signal can be indicative for an amount of the accumulated crop material in the feeding chamber 12. The sensor 50 e.g. may be or may comprise a pressure sensor. Such a pressure sensor may comprise a plate supported by a spring. Said plate, in other words pressure plate, may form a part of a wall of the feeding chamber 12. The pressure sensor may e.g. comprise means for measuring a displacement of the plate, e.g. a linear variable displacement transformer (lvdt) or another means. By means of a weight of accumulated crop material in the feeding chamber, the plate may displace against the spring. Such displacement may be detected by means of said lvdt or another means. In reaction to such displacement, the lvdt or another means may generate an electrical signal. Hence, a sensor signal may be generated that is indicative for an amount of the accumulated crop material in the feeding chamber. The sensor may e.g. be a trip sensor, preferably having a pressure plate. Alternatively, or additionally, the sensor 50 may be provided with optical, acoustical, and/or electrical sensor means, or more in general contactless sensor means that are arranged for sensing without making direct mechanical contact with the crop material, that are arranged for generating a sensor signal that is indicative for a presence of the accumulated crop material in the feeding chamber at or adjacent to a position along the feeding chamber. In that way the sensor signal can be indicative for an amount of the accumulated crop material in the feeding chamber 12. The sensor 50 e.g. may be or may comprise an infrared sensor. Such an infrared sensor may comprise an infrared transmitter and an infrared receiver. Reception, by the receiver, of infrared light that is transmitted by the transmitter, may be dependent on a presence of crop material in the feeding chamber adjacent to the transmitter and/or the receiver. Hence, such an infrared sensor 50 may generate a signal that is indicative for an amount of accumulated crop material in the feeding chamber 12. In an embodiment, a pressure sensor, and one or more infrared sensors or more in general contactless sensors, may be combined into one sensor, optionally a distributed sensor wherein a pressure sensor is spaced apart from at least one infrared sensor or more in general at least one contactless sensor. A distributed sensor may be arranged for measuring a presence of accumulated crop material at a plurality of positions along the feeding chamber 12.

More in general, the sensor 50, or at least a part of the sensor 50, is, optionally, positioned away from the outlet 16. Hence, in such configuration the sensor, or at least a part thereof, is positioned closer to the inlet 15 than to the outlet 16. In use, the sensor, or at least a part thereof, is spaced apart from said pre-compression chamber. Such sensor positions may enable that the sensor signal gives a more reliable indication of the amount of the amount of crop material in the feeding chamber.

However, the sensor 50 can also be positioned in other positions in the feeding chamber 12 depending for example on the desired properties of the feeder system. For example, it has been observed by the person skilled in the art that when using a stuffer with different possible strokes, a location of the sensor 50 where the sensor 50 is positioned closer to the outlet 16 than to the inlet 15 is preferred as such a positioned sensor 50 has been found to be more reliable. However, the sensor 50, depending on the desired configuration, can also be positioned, for example, in the middle of the feeding chamber 12 where it is substantially equidistant from the inlet 15 and the outlet 16.

The feeder system may comprise a controller 60 that is arranged for determining a position of the plunger 8. For example, the feeder system may comprise a plunger sensor that is indicative for a position of the plunger 8 and that is coupled to the controller. Such a plunger sensor may e.g. be coupled to a knotter (not drawn but e.g. conventional as such) provided in the rectangular baler. Said knotter may be arranged for forming a bale from crop materials that are pressed by means of the plunger 8. The knotter may be arranged for wrapping a twine around a bale. The knotter may be arranged for carrying out a knotter cycle that starts subsequently to forming a certain bale and ends when the bale next to that certain bale has been formed. Reaching a certain point in the knotter cycle may be indicative for a position of the plunger 8. Thus, by being coupled to the knotter, the controller may be arranged for determining a position of the plunger 8. Optionally, the controller 60 may be coupled to the driving means for determining a position of the plunger 8. Such controller 60 is schematically indicated in FIGS. 1A-2C. Couplings with the controller 60 are indicated by lines 62. Such couplings may be electronic, e.g. wired or wireless. Alternatively or additionally, such couplings may be mechanic. The controller 60 may be coupled to the sensor 50 and the stuffer 14. The controller may be coupled to the stuffer via the driving means 30, as schematically indicated in FIGS. 1A-2C.

More in general, the controller may, optionally, be arranged for inferring from the sensor signal an amount of accumulated crop material in the feeding chamber, or for inferring from the sensor signal a parameter that is indicative for an amount of accumulated crop material in the feeding chamber. Such inferring may be used for determining whether the sensor signal is indicative for reaching at least a predetermined amount of crop material in the feeding chamber. Alternatively or additionally, such inferring may be based on an indication by means of the sensor signal of the amount of the accumulated crop material in the feeding chamber. Inferring an amount of crop material in the feeding chamber from the sensor signal may be based on previously determined correlations between said amount and the sensor signal. For example, a value of one or more feeding parameters such as e.g. a type of the crop material, a filling speed, for example inferred from the time between two stuffer strokes, a number of stuffer strokes used for forming one bale, and/or a number of pressing cycles carried out for forming one bale, may be input parameters in such correlations. In particular, the controller may be arranged for carrying out a learning algorithm for determining such a correlation. The learning algorithm may have as input variables the sensor signal, the weight of a formed bale, the value of one or more feeding parameters such as e.g. a type of the crop material, the filling speed, for example inferred from the time between two strokes, the number of stuffer strokes used for forming one bale, and/or the number of pressing cycles carried out for forming one bale. Other optionally relevant parameters, such as weather conditions, may be apparent for the skilled person.

The controller may be further arranged for, after determining that the plunger has reached a predetermined position, and after the sensor signal is indicative for at least the predetermined amount of accumulated crop material having accumulated in the feeding chamber, triggering the stuffer to start a stuffing cycle. Said predetermined position may generally refer to a feeding position, or to a position that is relatively close to a feeding position while the plunger is moving to a feeding position so that, when carrying out the stuffing stroke after said triggering, the crop material can be fed into the baling chamber. Said predetermined amount may refer to a minimum amount for which it is useful to carry out a stuffing stroke. Such a minimum weight may e.g. be approximately equal to a minimum bale weight, or one halve or one third thereof. Such values may correspond with respective situations wherein respectively one, two, or three, stuffing cycles are carried out for forming one bale. Typically, by way of an example, a typical straw/barley bale weighs 400 kg, whereas a silage bale can weigh 800/900 kg. According to an embodiment, the predetermined amount of accumulated crop material may be inferred from dimensions of the feeding chamber in between a position of the sensor and the outlet of the feeding chamber, in combination with an assumed density of the crop material in the feeding chamber in between said position of the sensor and said outlet of the feeding chamber. Such an assumed density may be based on previously developed correlations between feeding parameters on the one hand, such as a type of the crop material and/or a filling rate of the feeding chamber, and on the other hand the density and/or amount, e.g. mass, of the crop material in the feeding chamber.

Advantageously, the entry position 22A and/or the exit position 22B, preferably also a distance between the entry position and the exit position, is adjusted in response to the indication by means of the sensor signal of the amount of the accumulated crop material in the feeding chamber 12. Alternatively or additionally, the stroke depth D of the stuffing stroke may be adjusted in response to an indicated by means of the sensor signal of the amount of the accumulated crop material in the feeding chamber. E.g., the distance between the entry position and the exit position may be increased and/or the stroke depth may be increased operating the stuffer only partly (say distance D/2) in the feeding chamber, in response to an indication by means of the sensor signal of the amount of the accumulated crop material in the feeding chamber being less than a lower amount value. FIGS. 1A, 1B, and 1C show a modified stuffing cycle having, compared to a normal stuffing cycle, an increased distance between the entry position and the exit position. FIGS. 2A, 2B, and 2C show another modified stuffing cycle having, compared to a standard stuffing cycle, a decreased distance between the entry position and the exit position. In a standard stuffing cycle, the entry position may be at or adjacent to a position of mechanical sensor means such as a pressure sensor. In a standard stuffing cycle, the exit position may be at or adjacent to the outlet and/or the baling chamber. In a practically valuable variation, at least the exit position, and preferably also the distance between the entry position and the exit position, is adjusted by adjusting at least the entry position. In a generally applicable embodiment, the entry position is adjusted and the exit position is kept substantially constant. Preferably, although not necessarily, the entry position is as close to the rotor as possible. In said generally applicable embodiment, the stroke depth D may or may not be adjusted. Such an embodiment allows a relatively efficient stuffer stroke wherein the pushing element 18 substantially reaches the outlet, independent of the adjusting.

Alternatively or additionally, the stroke depth may be decreased, in response to an indication by means of the sensor signal of the amount of the accumulated crop material in the feeding chamber exceeding an upper amount value. Hence, preferably, adjustment of the stuffer stroke, in comparison with a standard stuffing stroke corresponding with a standard indicated amount value, may be performed when the indicated amount is outside a range limited by said upper amount value and said lower amount value. Said range may e.g. be from 90% to 110% of said standard amount value, or may range from 75% to 125% of said standard amount value. Such standard amount value may e.g. be a weight of approximately 40 kilogram or a weight of approximately 50 kilogram, or a weight in between approximately 40 kilogram and approximately 50 kilogram, or may be one halve or one third of said standard amount value. Such values may correspond with respective situations wherein respectively one, two, or three, stuffing cycles are carried out for forming one bale.

FIG. 3 shows a feeder system 2 in an embodiment according to the invention. The feeder system 2 comprises the feeding chamber 12, the collector 20, and the stuffer 14 that comprises the pushing element 18. A path 24 of a tip 18A of the pushing element 18 during a normal stuffing cycle is also indicated in FIG. 3. In the further embodiment, the stuffer 14 is arranged for varying the entry position 22A, the exit position 22B, and/or the stroke depth D.

In the further embodiment, the stuffer comprises a stuffer base 68. The pushing element 18 is extendable with respect to the stuffer base 68. Thus, the pushing element 18 may be extendably attached to the stuffer base 68. The stuffer base 68 may be pivotably mounted, by means of a stuffer axle 70. The driving means may be arranged for driving the stuffer in pivoting motion, e.g. by means of an extendible driving part 72. The driving means 30 may further be arranged for driving the pushing element 18 in extending and retracting motion. An amplitude of said pivoting motion, and/or an amplitude said extending and retracting motion, may be adjustable. E.g. by adjusting one or both of said amplitudes, said path 24 may be adjusted. Hence, said entry position 22A, said exit position, and/or said depth D may be adjusted. Alternatively or additionally, the path 24 may be adjusted by changing a phase of said extending and/or retracting motion relative to a phase of said pivoting motion.

Furthermore, an embodiment of a method according to the invention is described. Such an embodiment preferably is carried out by means of a feeder system and/or agricultural baler described with reference to FIGS. 1A-3, but alternatively by means of another feeder system and/or agricultural baler. Said embodiment of a method may thus be described with reference to FIGS. 1A-3.

Said embodiment of a method may comprise repeatedly feeding a quantity of a crop material towards the baling chamber 10 of the agricultural rectangular baler 4. Such feeding is carried out by means of the feeder system 2 comprising the feeding chamber 12 and the stuffer 14 that comprises the pushing element 18. The feeding chamber 12 has an inlet 15 and an outlet 16 and in use extends towards the baling chamber 10 with the outlet 16 positioned adjacent to the baling chamber 10.

Said embodiment of a method may comprise repeatedly forming bales by moving the plunger 8 back and forth in between, on the one hand, feeding positions wherein a crop material can be fed into the baling chamber and, on the other hand, pressing positions wherein the crop material can be pressed into a bale. One or more, e.g. one, two, or three, pressing cycles may be carried out for forming one bale and/or for pressing agricultural material fed to the baling chamber into a bale or a part thereof. Each pressing cycle may include one forward pressing cycle stroke and one backward pressing cycle stroke.

Said embodiment of a method may comprise continuously collecting crop material and forcing the collected crop material into the feeding chamber 12 via the inlet 15 of the feeding chamber 12. Said term "continuously" may refer to a substantially uninterrupted collecting of crop material during a certain amount of time exceeding a time necessary for producing a plurality of bales. However, such continuity of collecting is not necessary.

Said embodiment of a method may further comprise repeatedly carrying out a stuffing cycle that comprises moving the pushing element 18 at least partly into the feeding chamber 12 at an entry position 22A positioned along the feeding chamber 12, moving the pushing element 18 through the feeding chamber 12 for carrying out a stuffing stroke 24A having a stroke depth D into the feeding chamber 12, and moving the pushing element 18 out of the feeding chamber 12 at an exit position 22B positioned along the feeding chamber 12. As a result, after carrying out a stuffing cycle, crop material that has accumulated in the feeding chamber is transported through the outlet 16 and fed to the baling chamber 10 as a result of the stuffing stroke.

Said embodiment of a method may further include generating, by means of the sensor 50 of the feeder system 2, a sensor signal that is indicative for an amount of the accumulated crop material in the feeding chamber 12. The embodiment may further comprise determining, by means of the controller 60 of the feeder system 2, a position of the plunger 8. The embodiment may further comprise triggering, by means of the controller 60 that is coupled to the sensor 50 and the stuffer 14, after determining that the plunger 8 has reached a predetermined position and after receipt of the sensor signal being indicative for at least a predetermined amount of accumulated crop material in the feeding chamber 12, the stuffer 14 to start a stuffing cycle.

Said embodiment of a method may further comprise adjusting, in said started stuffing cycle, the distance between the entry position 22A and the exit position 22B. Alternatively or additionally, the embodiment may comprise adjusting the stroke depth D. Such adjusting step or adjusting steps may be carried out in response to an indication by means of the sensor signal of the amount of the accumulated crop material in the feeding chamber 12.

The invention is not limited to embodiments, examples, variations, aspects, features and the like that are described above. In a generally applicable embodiment, the feeder system, in particular the agricultural baler, may be provided in assembly with a monitor, or other representation means, arranged for representing a capacity indicator. Said capacity indicator may be indicative for a capacity at which, in use, the agricultural baler is operated. The capacity may be dependent on, e.g. proportional to, a time difference between a fixed moment of the knotter cycle associated with a certain bale and a moment of starting a stuffer cycle, e.g. a standard stuffer cycle, that makes a first contribution, optionally the only contribution, to that certain bale. Alternatively or additionally, the capacity may be dependent on, e.g. proportional to, a cycle time of the plunger. Alternatively or additionally, the capacity may be dependent on, e.g. inversely proportional to, a filling time of the feeding chamber, i.e. a time needed from an end of a stuffer cycle to a start of a next stuffer cycle. For example, the capacity may be equal to a plunger cycle time divided by a filling time of the feeding chamber, e.g. for a stuffing stroke of standard length and depth. If the capacity is relatively high, the feeding chamber 12 may be filled relatively fast. If the capacity on the other hand is relatively low than the feeding chamber is filled relatively slow. Hence, in case of a relatively low capacity, the stuffer stroke may be shortened and/or the stroke depth D may be decreased along at least part of the stuffer stroke and vice-versa.

It may thus be appreciated if, in an embodiment, the capacity index forms, or is representative for, a sensor signal that is indicative for at least a predetermined amount of accumulated crop material in the feeding chamber. Hence, by coupling the stuffer to the capacity index or a signal for which the capacity index is representative, triggering of the stuffer to start a stuffing cycle can be controlled. Thus, a relatively constant density, and hence usually also mass, of produced bales, representing a more even top and bottom filling of the produced bale, may be obtained. Further examples of a capacity index may be found in EP 1 066 747. For example, the ratio described in paragraph 0026 of EP 1 066 747, or a parameter inferred from that ratio, may be regarded as an example of a capacity index.

The invention is not limited to embodiments, variations, aspects, examples, and/or features that are described herein. For example, there is provided an agricultural baler with a feeder system arranged for repeatedly feeding a quantity of a crop material towards a baling chamber, the feeder system comprising a feeding chamber and a stuffer that comprises a pushing element, wherein the feeding chamber has an inlet and an outlet and in use extends towards the baling chamber with the outlet positioned adjacent to the baling chamber, wherein the feeder system is arranged for, preferably continuously, collecting a crop material and forcing the collected crop material into the feeding chamber via the inlet of the feeding chamber, wherein the stuffer is arranged for repeatedly carrying out a stuffing cycle, so that, in use, crop material that has accumulated in the feeding chamber is transported through the outlet and fed to the baling chamber, wherein the stuffer is arranged for varying the entry position and/or the exit position and/or the stroke depth, wherein the feeder system further comprises a sensor that is arranged for generating a sensor signal that is indicative for an amount of the accumulated crop material in the feeding chamber, wherein the feeder system comprises a controller that is arranged for determining a position of the plunger and that is coupled to the sensor and the stuffer, wherein the controller is arranged for, after determining that the plunger has reached a predetermined position and after receipt of the sensor signal being indicative for at least a predetermined amount of accumulated crop material in the feeding chamber, triggering the stuffer to start a stuffing cycle wherein a distance between an entry position of the pushing element into the feeding chamber and/or an exit position of the pushing element out of the feeding chamber and/or the stroke depth, is adjusted in response to an indication by means of the sensor signal of the amount of the accumulated crop material in the feeding chamber. Such a feeder system may be combined with one or more embodiments, variations, aspects, examples, and/or features that are described herein. It may be appreciated that, herein, possible ways of controlling a variable stuffer in a rectangular baler are disclosed. As a result, a feeder system may be arranged to select a stuffer stroke path form various possible stuffer stroke paths.

The invention claimed is:

1. An agricultural rectangular baler comprising:
   a feeder system for feeding a quantity of crop material towards a baling chamber of the baler,
   the feeder system comprising a feeding chamber and a stuffer comprising a pushing element,
   wherein the stuffer is arranged for carrying out a stuffing cycle that comprises moving the pushing element at least partly into the feeding chamber at an entry position positioned along the feeding chamber, moving the pushing element through the feeding chamber for carrying out a stuffing stroke having a stroke depth into the feeding chamber, and moving the pushing element out of the feeding chamber at an exit position positioned along the feeding chamber, the stuffer arranged for varying at least one of the entry position, the exit position, and the stroke depth,
   wherein the feeder system further comprises at least one sensor arranged for generating a sensor signal that is indicative of an amount of accumulated crop material in the feeding chamber, a controller coupled to the at least one sensor and the stuffer, the controller configured for triggering the stuffer to start a stuffing cycle wherein at least one of the entry position, the exit position, and the stroke depth is adjusted in response to the sensor signal,
   wherein the controller is further arranged for triggering the stuffer to start a modified stuffing cycle wherein a distance between the entry position and the exit position is increased compared to the normal stuffing cycle in response to an indication, by the sensor signal, of the amount of the accumulated crop material in the feeding chamber being less than a lower amount value.

2. The agricultural baler according to claim 1, wherein the controller is further arranged for triggering the stuffer to start a stuffing cycle wherein the stroke depth is increased in response to an indication by the sensor signal of the amount of the accumulated crop material in the feeding chamber being less than a lower amount value.

3. The agricultural baler according to claim 1, wherein the controller is further arranged for triggering the stuffer to start a stuffing cycle wherein at least one of a distance between the entry position and the exit position is decreased and the stroke depth is decreased, in response to an indication by the sensor signal of the amount of the accumulated crop material in the feeding chamber exceeding an upper amount value.

4. The agricultural baler according to claim 1, further comprising an adjustable barrier positioned at or adjacent to an outlet of the feeding chamber and that is arranged for selectively enabling transport of crop material through the outlet, the barrier arranged for enabling feeding of crop material into the baling chamber when a plunger of the baling chamber is in a feeding position and for substantially blocking feeding of crop material into the baling chamber at least when the plunger is in a pressing position.

5. The agricultural baler according to claim 4, wherein the feeder is arranged for collecting a crop material and forcing the collected crop material into the feeding chamber via an inlet of the feeding chamber so that the crop material accumulates in the feeding chamber, wherein the barrier is arranged for substantially blocking feeding of crop material into the baling chamber at least when the plunger is in a pressing position.

6. The agricultural baler according to claim 4, wherein the baling chamber and the outlet of the feeding chamber are positioned in the agricultural baler such that the plunger forms the adjustable barrier.

7. The agricultural baler according to claim 1, comprising a collector arranged for collecting a crop material and forcing the collected crop material into the feeding chamber via an inlet of the feeding chamber.

8. The agricultural baler according to claim 4, further comprising a drive for driving the plunger with a plunger driving frequency and driving the pushing element of the stuffer with a stuffer driving frequency that can be set equal to or different from the plunger driving frequency.

9. The agricultural baler according to claim 8, wherein said drive comprises a pin, wherein the pushing element is arranged pivotably around said pin and slidingly along said pin, and wherein a position of said pin in the feeder system is adjustable, so that the stuffer is arranged for varying at least one of the entry position, the exit position, and the stroke depth.

10. The agricultural baler according to claim 1, wherein the at least one sensor is a mechanical sensor arranged for generating a sensor signal that is indicative for a weight of the accumulated crop material in the feeding chamber.

11. The agricultural baler according to claim 1, wherein the at least one sensor is at least one of an optical, acoustical, and electrical sensor arranged for generating a sensor signal indicative for a presence of the accumulated crop material in the feeding chamber at or adjacent to a position along the feeding chamber.

12. The agricultural baler according to claim 1, wherein the at least one sensor is a distributed sensor having sensor elements that are distributed along the feeding chamber for generating sensor signals that are indicative of an amount of the accumulated crop material at different positions along the feeding chamber.

13. Method for using an agricultural rectangular baler, the baler comprising a feeder system for feeding a quantity of crop material towards a baling chamber of the baler, the feeder system comprising a feeding chamber and a stuffer comprising a pushing element, the method comprising the steps of:

collecting a crop material and forcing the collected crop material into the feeding chamber via an inlet of the feeding chamber;

repeatedly carrying out a stuffing cycle that comprises moving the pushing element at least partly into the feeding chamber at an entry position positioned along the feeding chamber, moving the pushing element through the feeding chamber for carrying out a stuffing stroke having a stroke depth into the feeding chamber, and moving the pushing element out of the feeding chamber at an exit position positioned along the feeding chamber, so that, after carrying out a stuffing cycle, crop material that has accumulated in the feeding chamber is transported through the outlet and fed to the baling chamber as a result of the stuffing stroke;

generating, by at least one sensor of the feeder system, a sensor signal that is indicative for an amount of the accumulated crop material in the feeding chamber, triggering, by a controller that is coupled to the sensor and the stuffer, the stuffer to start a stuffing cycle; and the stuffer adjusting, in said started stuffing cycle, at least one of the entry position, and the exit position, in response to the at least one sensor signal, such that the distance between the entry position and the exit position is increased.

14. Method according to claim 13, wherein the stuffer adjusting step further comprises increasing the stroke depth in response to the sensor signal.

* * * * *